Jan. 1, 1924. 1,479,322
H. W. SANFORD
MINE CAR
Filed June 3, 1922 4 Sheets-Sheet 4

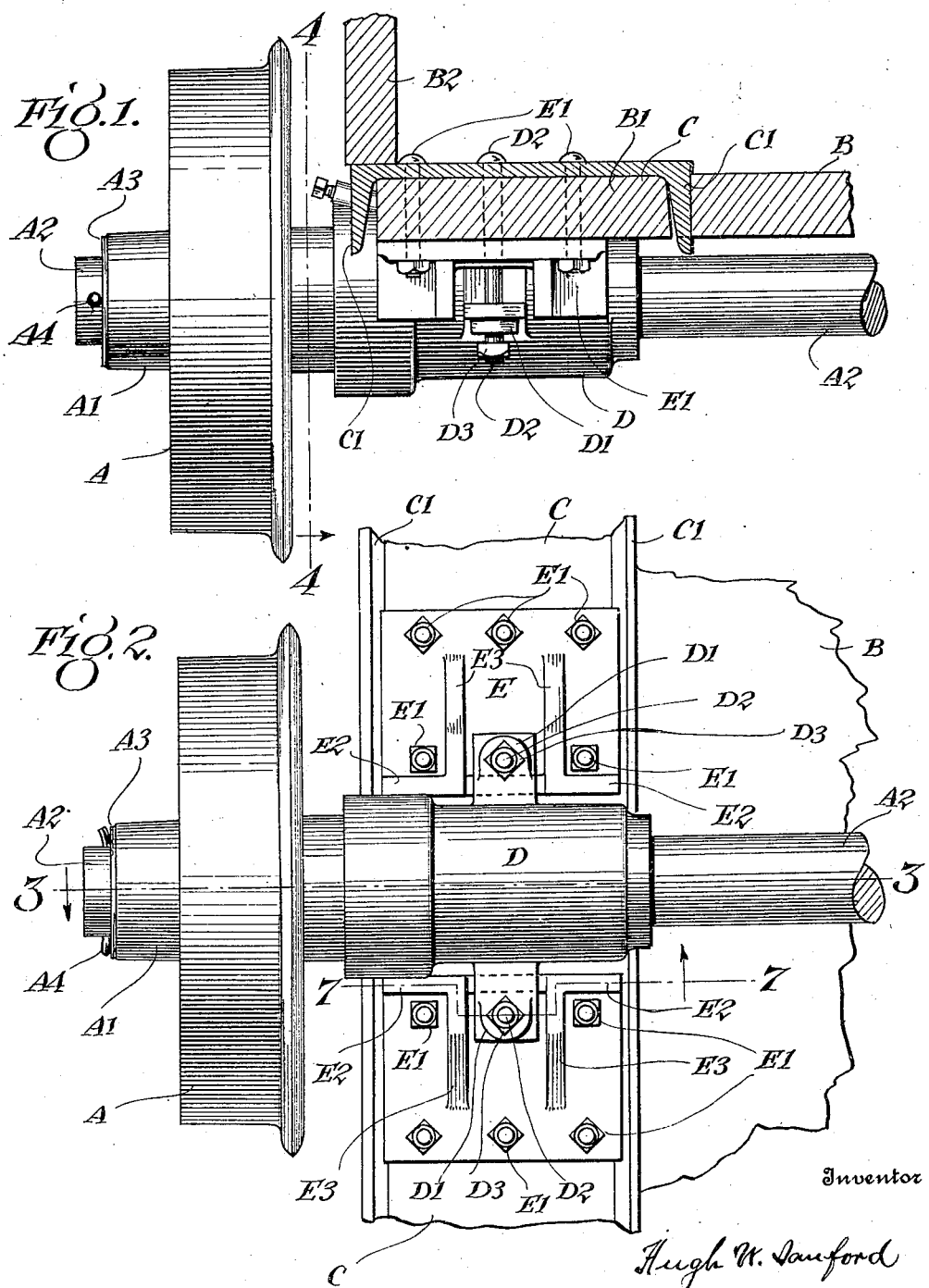

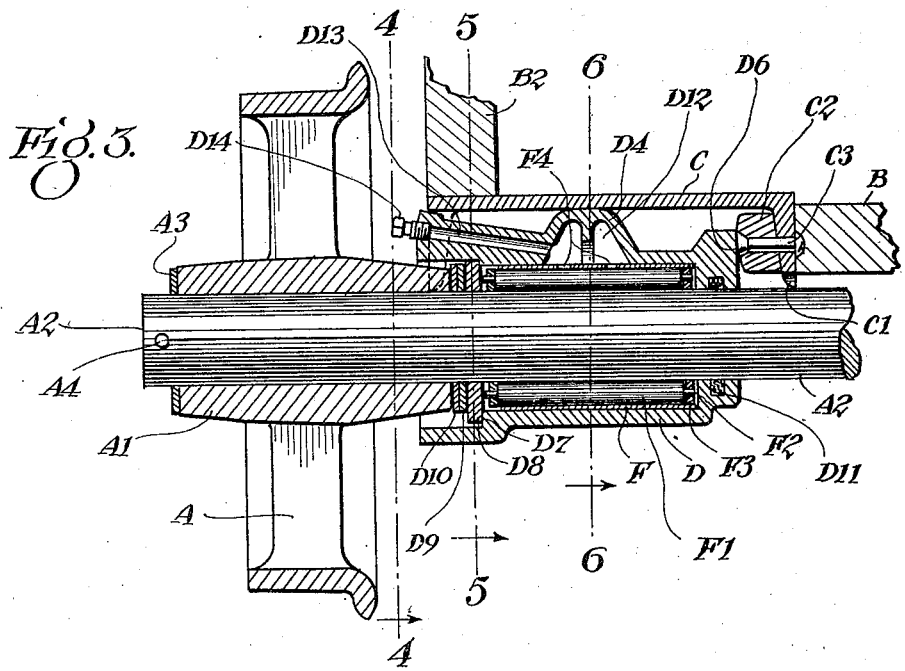
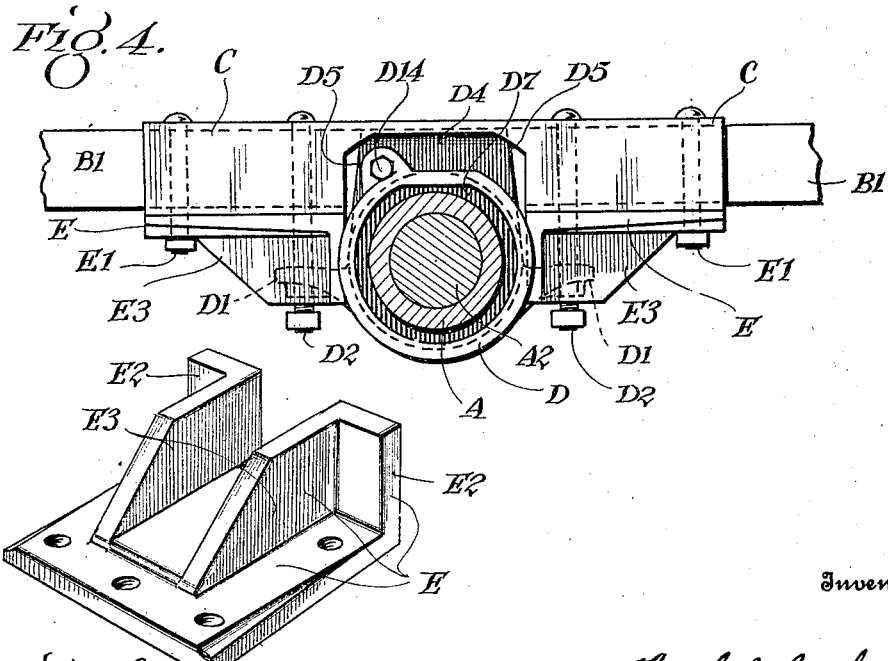

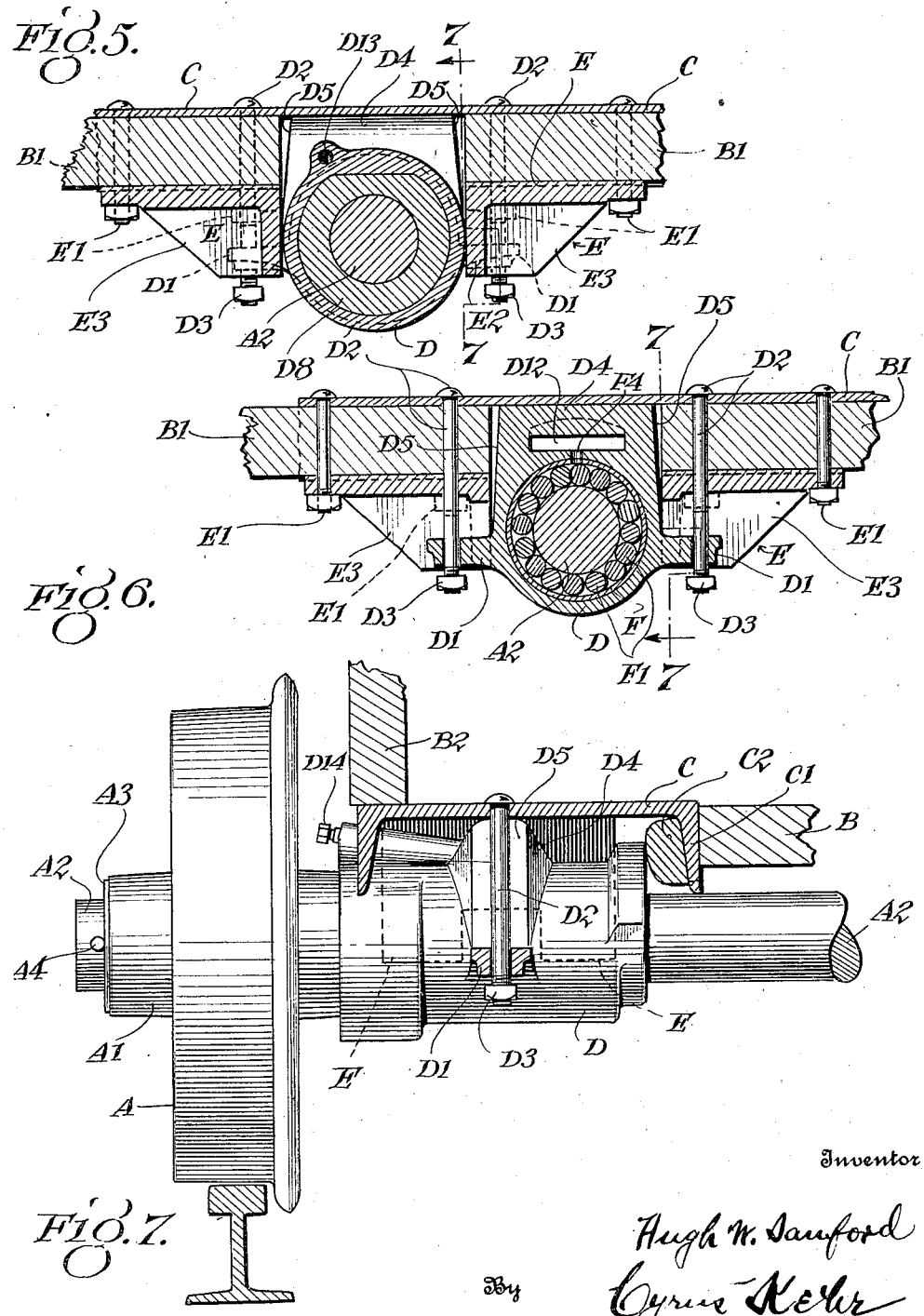

Inventor
Hugh W. Sanford
By Cyrus Kehr
Attorney

Patented Jan. 1, 1924.

1,479,322

UNITED STATES PATENT OFFICE.

HUGH W. SANFORD, OF KNOXVILLE, TENNESSEE.

MINE CAR.

Application filed June 3, 1922. Serial No. 565,567.

*To all whom it may concern:*

Be it known that I, HUGH W. SANFORD, a citizen of the United States, residing at Knoxville, in the county of Knox and State of Tennessee, have invented a new and useful Improvement in Mine Cars, of which the following is a specification, reference being had to the accompanying drawing.

My improvement relates particularly to mine cars in which the wheel axles extend under the car body floor and through axle boxes secured to the car body adjacent the track wheels.

One of the objects of this invention is to so combine the axle boxes with the car body as to place the bottom of the body lower than has heretofore been done in similar cars. This feature is desirable, because it gives the cars more load capacity when there is limited head room in the mine. In many mines, the head room is so limited as to require limiting the height of the upper part of the car body. Yet, for the sake of economical operation, it is desirable to haul large loads. A further object of the invention is to embody in such structure means whereby the axle box is made self-aligning—pressure throughout the length of the axle box on the axle being kept equal when the adjacent part of the car bottom is put out of parallel with the axle.

In my improvement, the structure of the axle boxes and the car body is such as to bring the supporting engagement between the boxes and the car body close to the upper surface of the car body flooring whereby the lower surface of the car body floor is brought closer to the axle than is the case in similar mine cars heretofore built.

In the accompanying drawings—

Fig. 1 is a transverse, upright section through a part of a car body near one of the wheels and the adjacent axle box;

Fig. 2 is a bottom view of the part of the car shown by Fig. 1, the planking under the bridge plate being omitted;

Fig. 3 is an upright section on the line, 3—3, of Fig. 2, the parts being shown in the upright position;

Fig. 4 is an upright section on the line, 4—4, of Figs. 1 and 3, looking toward the right;

Fig. $4^a$ is a perspective of one of the pedestals.

Figure 8:
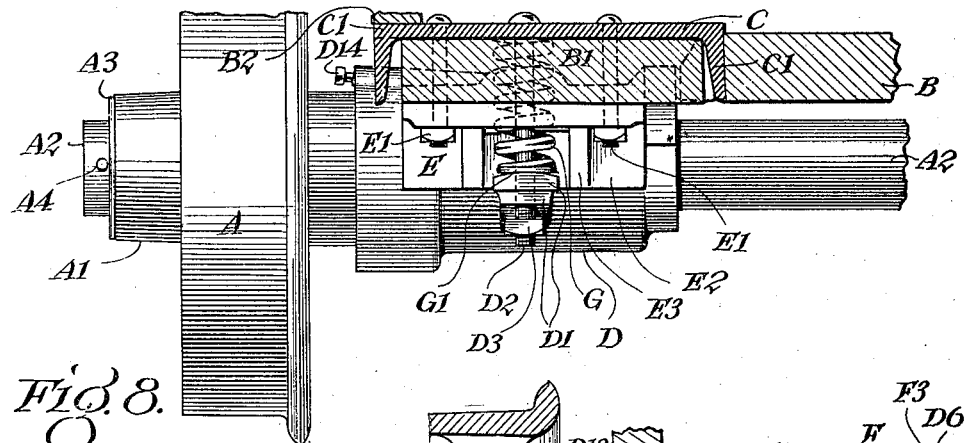
Figure 9:
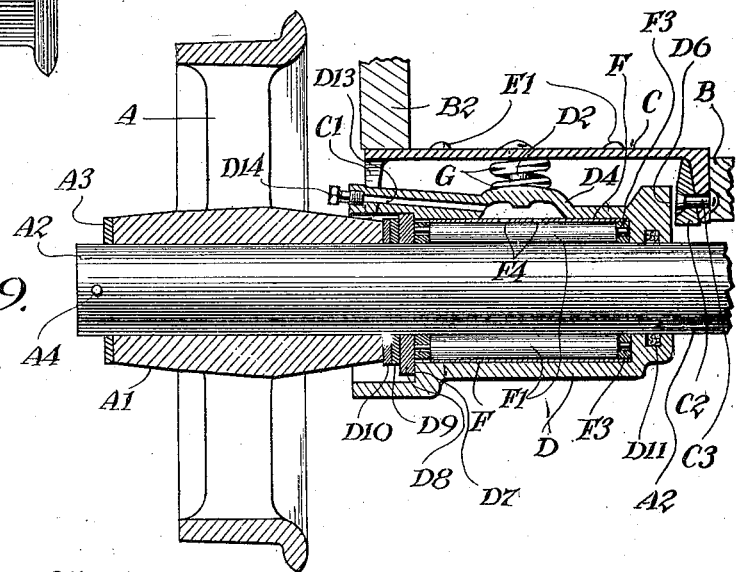
Figure 10:
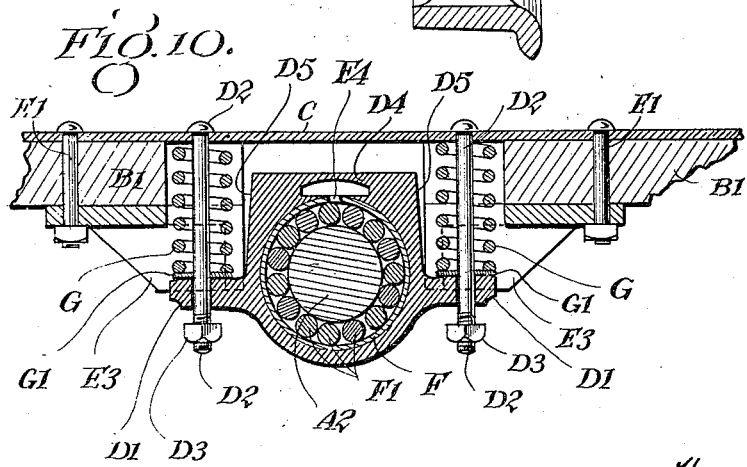

Fig. 5 is an upright section on the line, 5—5, of Fig. 3, looking toward the right;

Fig. 6 is an upright section on the line, 6—6, of Fig. 3, looking toward the right;

Fig. 7 is an upright section on the line, 7—7, of Figs. 2, 5 and 6, looking toward the axle;

Figs. 8, 9 and 10 are views similar to Figs. 1, 3 and 6, respectively, springs being added to the structure.

Referring to Figs. 1 to 8, inclusive, of said drawings, A is one of the car wheels. $A^1$ is the hub of the wheel. $A^2$ is the axle. $A^3$ is a washer surrounding the axle adjacent the outer end of the hub. $A^4$ is a cotter pin or cross member extending through the axle to retain said washer.

B is a part of the main part of the flooring of the car body. $B^1$ is a part of the floor planking to which the channel-form bridge plate, C, is applied. $B^2$, is a part of the side wall planking of the car body. At the side edge of the car body floor, the planking has a gap adapted to receive the upper part of an axle box, D.

The bridge-form channel plate, C, is placed parallel to the length of the car and is seated on the planking, $B^1$, with the flanges, $C^1$, extending downward at each side of said planking. Thus said channel plate may be regarded as a bridge supported by said planking and extending across said gap. By thus placing said bridge plate, the lower face of said plate is at the level of the upper face of said flooring. At the middle of the bridge plate the outer flange, C, is cut away to make room for the axle box, D. In the first form shown by the drawings, the axle box is formed for rocking on the lower face of the bridge plate.

At each side of the axle box is a pedestal, E, the upper face of which is placed flatwise against the lower face of the planking $B^1$. Upright bolts, $E^1$, extend through the horizontal part of the pedestal and the planking, $B^1$, and the horizontal body of the bridge plate, C, whereby the pedestals and said planking and said bridge plate are firmly bound to each other. Each pedestal has at its edge adjacent the axle box a downward-directed wall, $E^2$, at the middle of which is a gap to receive the horizontal ear, $D^1$, rigid on the axle box, D. At each side of said gap is a downward-directed wall, $E^3$, integral with the wall, $E^2$, and parallel to the length of the bridge plate. A bolt, $D^2$, extends loosely through each ear, $D^1$, and through the horizontal part of the pedestal and through the planking, $B^1$, and the body of the bridge plate. Said bolts are long enough to allow applying a nut, $D^3$, on the bolt low enough to normally leave space between the nut and the ear, in order that the ear may have limited up and down play on the bolt.

The upper part of the axle box casting is raised to form a back, $D^4$, which is transverse to the axle and has an upper face which is horizontal and parallel to the length of the bridge plate and upwardly extended in the middle portion. Said back bears against the lower face of the bridge plate and forms a support for the car body. The axle box and the bridge plate may rock relatively to each other on said back, the plane of the car floor and the horizontal plane of the axle box being moved into and out of parallel to each other. At each side of the axle box, the back, $D^4$, presents an upright face, $D^5$, adapted to bear against the adjacent face of the adjacent pedestal, E. By this means and by means of the bolts, $D^2$, the axle box is held against movement parallel to the length of the car.

The inner end of the axle box has a shoulder, $D^6$, which normally bears against an abutment block, $C^2$, secured to the inner face of the adjacent flange, $C^1$, of the bridge plate, C, by a rivet, $C^3$. By this means inward thrust on the axle box is resisted. Movement of the axle box in the opposite direction is resisted by the hub, $A^1$, of the track wheel, A, and outward movement of said hub is resisted by the washer, $A^3$, and the cotter or cross pin, $A^4$.

The inner end of the axle box is shown as having a fixed wall. The interior of the outer end of the axle box is made large enough to receive the inner end of the hub, $A^1$, of the wheel, A. The diameter of the remainder of the interior of the axle box is smaller. At the meeting of the larger and the smaller parts of the box is a shoulder, $D^7$, which is annular, excepting that its upper part is horizontal, the part of the wall extending outward from said shoulder in the upper part of the box being also horizontal or flattened. $D^8$ is a metal end wall surrounding the axle and resting against the shoulder, $D^7$, said wall being ring-form, excepting that its upper edge is cut straight to conform to the box wall in front of the shoulder, $D^7$. Thus the upper edge of said end wall makes such engagement with the box wall as prevents rotation of the end wall, although the end wall is not secured in position by bolts or screws or similar means. Hence said wall may be called a free end wall.

Between the hub and the free end wall and bearing against the latter is a fiber washer, $D^9$; and between that washer and the end of the hub, $A^1$, is a metal washer, $D^{10}$.

A sleeve, F, is fitted into the interior of the axle box. Between the sleeve and the axle are anti-friction rollers, $F^1$, having end journals, $F^2$, seated in rings, $F^3$. These rollers and the parts associated therewith are of well-known form.

The part of the casting which forms the back, $D^4$, is hollow, whereby there is formed a lubricant chamber, $D^{12}$, across the middle of the upper part of the sleeve, F. From the back outward to the outer end of the axle box, the upper part of the casting is raised and bored to form an oil inlet, $D^{13}$, on which is a closing member, $D^{14}$. The lubricant chamber is of ample capacity to receive oil or grease through the inlet, $D^{13}$. From said chamber oil or grease can pass to the rollers and other parts needing lubrication. To facilitate distribution of the lubricant, the sleeve, F, may have perforations, $F^4$.

Referring now to Figs. 8, 9 and 10, the structure is the same as already described, excepting that an expanding or supporting coiled spring, G, is placed around each bolt, $D^2$, between the ear, $D^1$, and the bridge plate, C, the planking, $B^1$, being cut away to make room for the spring, and a washer, $G^1$, being placed around the bolt, $D^2$, between the spring and the ear, $D^1$. The springs, G, are high enough and strong enough to afford suport to the bridge plate above the axle box.

In cross-section parallel to the axle box axis the upper face of each ear is convex or raised in the middle, in order that the springs may at all times be supported substantially in the middle, upright transverse plane of the axle-box bearing. Thus each ear has the form of a trunnion.

It is to be observed that the back, $D^4$, and the springs, G, are in a common upright plane which is parallel to the length of the car and bisects the rollers, $F^1$, so that the support given to the car body is in that plane, whether the support is by said back or by said springs, and the axis of the rocking of the axle box is in that plane, whether the support is by said back or by the springs. In practice such rocking takes place during warping or twisting or flexing of the car bottom.

The rocking of the axle box relative to the car body in said plane, the plane cutting the middle of the axle box, permits a balanced pressure of the axle box on the axle at all times. Excessive pressure of the anti-friction rollers at one end on the axle is thereby avoided. In other words, the pressure by the rollers on the axle is equally distributed along the length of the rollers, regardless of the change of relation between the axle box and the car body. Thus avoiding concentration of pressure permits easier rotation of the axle and imparts greater durability to the axle and the axle box members.

In both forms, the removable end wall, $D^8$, makes it possible to remove the rollers, $F^1$, and the rings, $F^3$, without removing the axle box or the pedestals or the axle. After removing the wheel, A, the washers, $D^9$ and $D^{10}$, the wall, $D^8$, may be removed. Then the rollers and rings may be taken out and replaced. With these several advantageous features is associated the low positioning of the car body floor relative to the axle.

The bolts, $D^2$, constitute adjustable slack means permitting limited relative downward movement of the axle-box when unevenness in the track rails or twisting the car tends to separate the adjacent wheel from the rail. Thus there is maintained such engagement between the wheel and the rail as will prevent derailment.

I claim as my invention,

1. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate at said gap is brought approximately to the level of the upper face of the flooring, an axle box at said gap, means for holding the axle box against movement parallel to the length of the car body, an axle extending through the axle box, and a wheel on the axle, substantially as described.

2. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate at said gap is brought approximately to the level of the upper face of the flooring, an axle box at said gap, means holding the axle box to allow it to make adjustment relative to the bridge plate, an axle extending through the axle box, and a wheel on the axle, substantially as described.

3. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate at said gap is brought approximately to the level of the flooring, an axle box at said gap, means holding the axle box to allow it to make adjustment relative to the bridge plate in the upright plane in which lies the axis of the axle box, an axle extending through the axle box, and a wheel on the axle, substantially as described.

4. In a structure of the kind described, the combination with flooring having a gap adapted to receive the upper part of an axle box, of a metal bridge plate extending parallel to the length of the car body across said gap and the flooring in front of and at the rear of the gap, whereby the lower face of the bridge plate at said gap is brought approximately to the level of the upper face of the flooring, an axle box adapted to extend into said gap, guiding means placed at the front and at the rear of the axle box for holding the axle box against movement parallel to the length of the car and to permit up-and-down movement of the axle box relative to the car body, an axle extending through the axle box, and a wheel on the axle, substantially as described.

5. In a structure of the kind described, the combination with flooring having a gap adapted to receive the upper part of an axle box, of a metal bridge plate extending parallel to the length of the car body across said gap and the flooring in front of and at the rear of the gap, whereby the lower face of the bridge plate at said gap is brought approximately to the level of the upper face of the flooring, an axle box adapted to extend into said gap, guiding means placed at the front and at the rear of the axle box and secured to said plate for holding the axle box against movement parallel to the length of the car and to permit up-and-down movement of the axle box relative to the car body, an axle extending through the axle box, and a wheel on the axle, substantially as described.

6. In a structure of the kind described, the combination with flooring having a gap adapted to receive the upper part of an axle box, of a metal bridge plate extending parallel to the length of the car body across said gap and the flooring in front of and at the rear of the gap, whereby the lower face of the bridge plate at said gap is brought approximately to the level of the upper face of the flooring, an axle box adapted to extend into said gap, guiding means placed at the front and at the rear of the axle box for holding the axle box against movement parallel to the length of the car and to permit up-and-down movement of the axle box relative to the car body, means for limiting the relative downward movement of the axle box, an axle extending through the axle box, and a wheel on the axle, substantially as described.

7. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate at said gap is brought approximately to the level of the upper face of the flooring, a pedestal placed at each side of said gap and secured to the bridge plate and having upright faces and spaces, an axle box placed between said faces and having at each side an ear extending into the space of the adjacent pedestal, means for limiting relative downward movement of the axle box, an axle extending through the axle box, and a wheel on the axle, substantially as described.

8. In a structure of the kind described, the combination with flooring having a gap adapted to receive the upper part of an axle box, of a metal bridge plate extending parallel to the length of the car body across said gap and the flooring in front and at the rear of the gap, whereby the lower face of the bridge plate at said gap is brought approximately to the level of the upper face of the flooring, an axle box adapted to extend into said gap, guiding means placed at the front and at the rear of the axle box, bolts extending through said guiding means and the bridge plate, means for limiting the relative downward movement of the axle box, an axle extending through the axle box, and a wheel on the axle, substantially as described.

9. In a structure of the kind described, the combination with flooring having a gap adapted to receive the upper part of an axle box, of a metal bridge plate extending parallel to the length of the car body across said gap and the flooring in front and at the rear of the gap, whereby the lower face of the bridge plate at said gap is brought approximately to the level of the upper face of the flooring, an axle box adapted to extend into said gap, guiding means placed at the front and at the rear of the axle box, bolts extending through said guiding means and the bridge plate, bolts for limiting the relative downward movement of the axle box, an axle extending through the axle box, and a wheel on the axle, substantially as described.

10. In a structure of the kind described, the combination with flooring having a gap adapted to receive the upper part of an axle box, of a metal bridge plate extending parallel to the length of the car body across said gap and the flooring in front and at the rear of the gap, whereby the lower face of the bridge plate at said gap is brought approximately to the level of the upper face of the flooring, an axle box adapted to extend into said gap, guiding means placed at the front and at the rear of the axle box, bolts extending through said guiding means flooring, and bridge plate for limiting the relative downward movement of the axle box, an axle extending through the axle box, and a wheel on the axle, substantially as described.

11. In a structure of the kind described, the combination with flooring having a gap adapted to receive the upper part of an axle box, of a metal bridge plate extending parallel to the length of the car body across said gap and the flooring in front of and at the rear of the gap, whereby the lower face of the bridge plate at said gap is brought approximately to the level of the upper face of the flooring, an axle box adapted to extend into said gap and bear against the bridge plate, guiding means placed at the front and at the rear of the axle box for holding the axle box against movement parallel to the length of the car and to permit up-and-down movement of the axle box relative to the car body, an axle extending through the axle box, and a wheel on the axle, substantially as described.

12. In a structure of the kind described, the combination with flooring having a gap adapted to receive the upper part of an axle box, of a metal bridge plate extending parallel to the length of the car body across said gap and the flooring in front of and at the rear of the gap, whereby the lower face of the bridge plate at said gap is brought approximately to the level of the upper face of the flooring, an axle box adapted to extend into said gap and bear against the bridge plate, guiding means placed at the front and at the rear of the axle box and secured to said plate for holding the axle box against movement parallel to the length of the car and to permit up-and-down movement of the axle box relative to the car body, an axle extending through the axle box, and a wheel on the axle, substantially as described.

13. In a structure of the kind described, the combination with flooring having a gap adapted to receive the upper part of an axle box, of a metal bridge plate extending parallel to the length of the car body across said gap and the flooring in front of and at the rear of the gap, whereby the lower face of the bridge plate at said gap is brought approximately to the level of the upper face of the flooring, an axle box adapted to extend into said gap and bear against the bridge plate, guiding means placed at the front and at the rear of the axle box for holding the axle box against movement parallel to the length of the car and to permit up-and-down movement of the axle box relative to the car body, means for limiting the relative downward movement of the axle box, an axle extending through the axle box, and a wheel on the axle, substantially as described.

14. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate, at said gap is brought approximately to the level of the upper face of the flooring, a pedestal placed at each side of said gap and secured to the bridge plate and having upright faces and spaces, an axle box placed between said faces and adapted to bear against the bridge plate and having at each side an ear extending into the space of the adjacent pedestal, means for limiting relative downward movement of the axle box, an axle extending through the axle box, and a wheel on the axle, substantially as described.

15. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate at said gap is brought approximately to the level of the upper face of the flooring, an axle box at said gap in operative relation with said bridge plate to limit inward movement of the axle box, means for holding the axle box against movement parallel to the length of the car body, an axle extending through the axle box, and a wheel on the axle, substantially as described.

16. In a structure of the kind described, the combination with flooring having a gap adapted to receive the upper part of an axle box, of a metal bridge plate extending parallel to the length of the car body and across said gap and the flooring in front of and at the rear of the gap and having at its inner edge a downward-directed flange, whereby the lower face of the bridge plate at said gap is brought approximately to the level of the upper face of the flooring, an axle box at said gap in operative relation with said flange for limiting inward movement of the axle box, means for holding the axle box against movement parallel to the length of the car body, an axle extending through the axle box, and a wheel on the axle, substantially as described.

17. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate at said gap is brought approximately to the level of the upper face of the flooring, an axle box at said gap and having a horizontal transverse back adapted to bear against the bridge plate, means for holding the axle box against movement parallel to the length of the car body, an axle extending through the axle box, and a wheel on the axle, substantially as described.

18. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate at said gap is brought approximately to the level of the upper face of the flooring, an axle box at said gap and having a horizontal transverse back adapted to bear against the bridge plate and the axle box having under said back a lubricant chamber and having an inlet to said chamber, means for holding the axle box against movement parallel to the length of the car body, an axle extending through the axle box, and a wheel on the axle, substantially as described.

19. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate at said gap is brought approximately to the level of the upper face of the flooring, an axle box at said gap and having a horizontal transverse back adapted to bear against the bridge plate and the axle box having under said back a lubricant chamber and having an inlet extending from the outer end of the axle box into said chamber, means for holding the axle box against movement parallel to the length of the car body, an axle extending through the axle box, and a wheel on the axle, substantially as described.

20. In a structure of the kind described, the combination with flooring having a gap adapted to receive the upper part of an axle box, of metal bridge plate extending parallel to the length of the car body and across said gap and the flooring in front of and at the rear of the gap and having at its inner edge a downward-directed flange, an axle box at said gap, means for holding the axle box against movement parallel to the length of the car body, an axle extending through the axle box, and a wheel on the axle, substantially as described.

21. In a structure of the kind described, the combination with flooring having a gap adapted to receive the upper part of an axle box, of a metal bridge plate extending parallel to the length of the car body and across said gap and the flooring in front of and at the rear of the gap and having a flange at each side edge, an axle box at said gap, means for holding the axle box against movement parallel to the length of the car body, an axle extending through the axle box, and a wheel on the axle, substantially as described.

22. In a structure of the kind described, the combination with flooring having a gap adapted to receive the upper part of an axle box, of a metal bridge plate extending parallel to the length of the car body and across said gap and the flooring in front of and at the rear of the gap and having a downward-directed flange at each side edge, an axle box at said gap, means for holding the axle box against movement parallel to the length of the car body, an axle extending through the axle box, and a wheel on the axle, substantially as described.

23. In a structure of the kind described, the combination with flooring having a gap adapted to receive the upper part of an axle box, of a metal bridge plate extending parallel to the length of the car body and across said gap and the flooring in front of and at the rear of the gap and having a flange at each side edge, an axle box at said gap, a pedestal at the front and at the rear of the axle box, bolts extending through the pedestal, flooring and bridge plate, an axle extending through the axle box, and a wheel on the axle, substantially as described.

24. In a structure of the kind described, the combination with flooring having a gap adapted to receive the upper part of an axle box, of a metal bridge plate extending parallel to the length of the car body and across said gap and the flooring in front of and at the rear of the gap and having a downward-directed flange at each side edge, an axle box at said gap, a pedestal at the front and at the rear of the axle box, bolts extending through the pedestals, flooring and bridge plate, an axle extending through the axle box, and a wheel on the axle, substantially as described.

25. In a structure of the kind described, the combination with flooring having a gap adapted to receive the upper part of an axle box, of a metal bridge plate extending parallel to the length of the car body and across said gap and the flooring in front of and at the rear of the gap, whereby the lower face of the bridge plate at said gap is brought approximately to the level of the upper face of the flooring, an axle box placed at said gap and having at its outer end a removable end wall, means for holding the axle box against movement parallel to the length of the car body, an axle extending through the axle box, and a wheel on the axle, adjacent said removable end wall, substantially as described.

26. In a structure of the kind described, the combination with an axle and a wheel on the axle, of an axle box at the middle of which is a transverse back in which is a lubricant chamber, and means forming a lubricant passage from the outer end of the axle box into said chamber, substantially as described.

27. In a structure of the kind described, the combination with a car body, an axle, an axle box, means directly engaging the axle box for limiting movement of the axle box parallel to the length of the car body and permitting up-and-down movement, a trunnion-form ear at each side of the axle box in the middle upright transverse plane of said box, and means extending downward from the car bottom and resting on said ears, substantially as described.

28. In a structure of the kind described, the combination with a car body, an axle, an axle box, means directly engaging the axle box for limiting movement of the axle box parallel to the length of the car body and permitting up-and-down movement, a trunnion-form ear at each side of the axle box in the middle upright transverse plane of said box, and springs extending downward from the car bottom and resting on said ears, substantially as described.

29. In a structure of the kind described, the combination with a car body, an axle, an axle box, means directly engaging the axle box for limiting movement of the axle box parallel to the length of the car body and permitting up-and-down movement, a trunnion-form ear at each side of the axle box in the middle upright transverse plane of said box, means extending downward from the car bottom and resting on said ears, and a slack bolt joined to the car bottom and extending slidably through each ear, substantially as described.

30. In a structure of the kind described, the combination with a car body, an axle, an axle box, means directly engaging the axle box for limiting movement of the axle box parallel to the length of the car body and permitting up-and-down movement, a trunnion-form ear at each side of the axle box in the middle upright transverse plane of said box, springs extending downward from the car bottom and resting on said ears, and a slack bolt joined to the car bottom and extending slidably through each ear, substantially as described.

31. In a structure of the kind described, the combination of a longitudinal channel-form metal floor plate extending across the axle having its flanges directed downward, an axle, a wheel on the axle, an axle box pivoted to said plate in the middle transverse upright plane of the box, and means at each side of the axle box to limit movement of the axle box parallel to the length of the car body, substantially as described.

32. In a structure of the kind described, the combination with a longitudinal channel plate reaching across the axle and having its flanges directed downward, of an axle, a wheel on the axle, an axle box pivoted to said plate in the middle transverse upright plane of the box, and means at each side of the axle box to limit movement of the axle box parallel to the length of the car body, substantially as described.

33. In a structure of the kind described, the combination with a longitudinal channel plate reaching across the axle and having its flanges directed downward, of an axle, a wheel on the axle, an axle box pivoted to said plate in the middle transverse upright plane of the box and being in operative relation with one of said flanges to limit endwise movement of the box, and means at each side of the axle box to limit movement of the axle box parallel to the length of the car body, substantially as described.

34. In a structure of the kind described, the combination with a longitudinal channel plate reaching across the axle and having its flanges directed downward, of an axle, a wheel on the axle, an axle box in operative relation with said plate to limit movement of the axle box parallel to the axle and the axle box being in operative relation with said plate for relative rocking of said plate and the axle box in the middle upright transverse plane of the axle box, and means located at each side of the axle box and in operative relation with said plate for limiting movement of the axle box parallel to the length of the car, substantially as described.

35. In a structure of the kind described, the combination of a longitudinal metal channel plate having its flanges directed downward, a side wall supported on the outer part of the upper face of said plate, a floor member placed beside said plate adjacent its inner flange, an axle, a wheel on the axle, and an axle box surrounding the axle and in operative relation with said plate for relative rocking of the plate and the axle box in the middle, upright transverse plane of said box and for limiting movement of the axle box parallel to the length of the car, substantially as described.

36. In a structure of the kind described, the combination of a longitudinal metal channel plate having its flanges directed downward, a side wall supported on the outer part of the upper face of said plate, a floor member placed beside said plate adjacent its inner flange, an axle, a wheel on the axle, and an axle box surrounding the axle and in operative relation with said plate for limiting movement of the axle box parallel to the length of the car and having rocking engagement with the plate in the upright middle transverse plane of the axle box, substantially as described.

In testimony whereof I have signed my name, this 11th day of May, in the year one thousand nine hundred and twenty-two.

HUGH W. SANFORD.